US 6,593,992 B1

(12) United States Patent
Chin et al.

(10) Patent No.: US 6,593,992 B1
(45) Date of Patent: Jul. 15, 2003

(54) LIQUID CRYSTAL DISPLAY AND METHOD FOR FABRICATING THE SAME

(75) Inventors: Gyo Won Chin, Seoul (KR); Ho Jin Ryu, Angyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/291,373

(22) Filed: Nov. 12, 2002

(30) Foreign Application Priority Data

Dec. 20, 2001 (KR) .......................................... 2001-81871

(51) Int. Cl.[7] ...................... G02F 1/1368; G02F 1/1339

(52) U.S. Cl. ........................... 349/153; 349/122; 349/43

(58) Field of Search ................................ 349/122, 153, 349/154, 187, 190, 42, 43

(56) References Cited

U.S. PATENT DOCUMENTS

| | | | | |
|---|---|---|---|---|
| 5,798,813 A | * | 8/1998 | Ohashi et al. ............... | 349/154 |
| 5,986,736 A | * | 11/1999 | Kodera et al. .............. | 349/134 |
| 6,124,917 A | * | 9/2000 | Fujioka et al. .............. | 349/153 |
| 2002/0044232 A1 | * | 4/2002 | Cho et al. ...................... | 349/43 |
| 2002/0085161 A1 | * | 7/2002 | Yoo et al. .................... | 349/155 |
| 2003/0038913 A1 | * | 2/2003 | Choo .......................... | 349/149 |

* cited by examiner

Primary Examiner—Toan Ton
Assistant Examiner—Tai Duong
(74) Attorney, Agent, or Firm—Morgan, Lewis & Bockius LLP

(57) ABSTRACT

A liquid crystal display device, includes a substrate having an active region and a periphery region, an insulating film formed on the substrate, a passivation film formed on the insulating film and having a plurality of first and second contact holes formed along a circumference of the active region, a first seal pattern formed on the passivation film along a direction of the first contact holes, and a second seal pattern formed on the passivation film along a direction of the second contact holes.

16 Claims, 6 Drawing Sheets

US 6,593,992 B1

LIQUID CRYSTAL DISPLAY AND METHOD FOR FABRICATING THE SAME

The present invention claims the benefit of Korean Patent Application No. P2001-81871 filed in Korea on Dec. 20, 2001, which is hereby incorporated by reference.

BACKGROUND OF THE INVENTION

1. Field of the Invention

The present invention relates to a liquid crystal display (LCD) device, and more particularly, and to an LCD device and a method for fabricating the same, in which an adhesive power of upper and lower substrates is improved and a cell gap is uniformly maintained.

2. Discussion of the Prior Art

Generally, an LCD device is commonly used as a substitute for a cathode ray tube (CRT) because of its highs contrast ratio, suitability for displaying gray scales or moving pictures, and low power consumption. The liquid crystal display device for displaying images by external signals includes a thin film transistor (TFT) substrate, a color filter substrate, and a liquid crystal material layer. The TFT substrate has a TFT and a pixel electrode formed in each pixel region defined by gate and data lines. On the color filter substrate, a color filter layer and a common electrode are formed and the liquid crystal material layer is interposed between the two substrates. Presently, a spacer is inserted between the two substrates to leave a uniform space between them, and a sealant is formed along edges of the substrates to completely bond the two substrates together. The sealant prevents the liquid crystal material from flowing outside, and maintains a constant interval between the two substrates along a periphery of an active region.

A method for fabricating an LCD device according to the related art will be described below with reference to the accompanying drawings.

FIG. 1 is a cross sectional view of an LCD device according to the related art.

In FIG. 1, an LCD device includes upper and lower substrates 18 and 19 and a liquid crystal material layer 20 formed there between. A black matrix 11 for preventing a light leakage, a color filter 12 for displaying colors, and a common electrode 13 for applying a voltage to the liquid crystal layer 20 are formed on the upper substrate 18. Gate and data lines (not show) are formed on the lower substrate 19 and cross each other to define a pixel, a TFT 21 is formed at the crossings of the gate and data lines for switching a signal, and a pixel electrode 22 is formed on the liquid crystal material layer 20 forming an electric field by being provided with the signal from the TFT 21. In addition, an insulating film 27 is formed between the gate and data lines for insulating the gate and data lines from each other and a passivation film 28 is formed between the TFT 21 and the pixel electrode 22.

At this time, the gate insulting film 27 is deposited by a plasma enhanced chemical vapor deposition (PECVD) method using an inorganic material that closely adheres to the metal, and has an excellent insulating property, such as SiNx or SiOx, BCB or an acryl resin having a low dielectric constant property is used for a material of the passivation film 28. Additionally, a ball spacer 16 is inserted between the upper and lower substrates 18 and 19 and a seal pattern is formed on along the edges of the substrates for maintaining the interval of the two substrates.

In FIG. 2, the seal pattern is divided into an active seal pattern 14 and a dummy seal pattern 15. The active seal pattern 14 is formed along a circumference of an effective display area 13, thereby forming a cell gap and preventing a leakage of the liquid crystal material. The dummy seal pattern 15 is formed outside the active seal pattern 14, thereby absorbing vibrational shock generated during scribing and breaking process. The active and dummy seal patterns 14 and 15 are formed with an equal amount of a spray material, without being formed on an inlet 30 for the liquid crystal material. The active and dummy seal patterns 14 and 15 are formed by a screen printing method or a dispensing method using a thermosetting adhesive with a micro pearl material.

In FIG. 3. during the screen printing method, a screen mask 51 with a predetermined pattern is placed on the substrate 52, and a thermosetting adhesive 53 is dropped on the screen mask 51. Then, the thermosetting adhesive 53 is printed on the substrate 52 by a rubber squeezer. Accordingly, a seal pattern is formed on the substrate 52 as the thermosetting adhesive passes through the inlet of the screen mask 51.

During the dispensing method, the adhesive material is sprayed by compression of a sprayer filled with a thermosetting adhesive. Accordingly, a predetermined pattern is formed on the substrate to form a seal pattern.

In both methods, it is problematic to control the amount of spray material for forming the seal pattern. In addition, when the liquid crystal material is injected between the substrates, the liquid crystal material may leak through the space between the seal pattern and the passivation film 28 due to a lower adhesive strength of the sealant and organic insulating film.

In FIGS. 4A and 4B, a contact hole 29 is formed on the lower part of the active seal pattern 14. Accordingly, the active seal pattern 14 contacts the gate insulating film 12, thereby improving the adhesive strength of the sealant and organic irritating film.

In FIG. 4B, a step difference (b−a) is generated between the active and dummy seal patterns 14 and 15. Because of the step difference, intervals between the upper and lower substrates become uneven, and the liquid crystal material may flow outside the substrates since the active seal pattern 14 does not adhere to the upper substrate. Controlling the amount of spraying material can be one way to reduce the step difference between the active and dummy seal patterns 14 and 15. However, controlling the amount of spray material remains difficult.

SUMMARY OF THE INVENTION

Accordingly, the present invention is directed to a liquid crystal display device and a method for fabricating the same that substantially obviates one or more problems due to limitations and disadvantages of the prior art.

An object of the present invention is to provide an LCD device and a method for fabricating the same, in which a uniform cell gap is maintained and an adhesive strength between upper and lower substrates is improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device, includes a substrate having an active region and a periphery region; an insulating film formed on the substrate; a passivation film formed on the insulating film and having a plurality of first and second contact holes formed along a circumference of the active region; a first seal pattern formed on the passivation film along a direction of the first contact holes; and a second seal pattern formed on the passivation film along a direction of the second contact holes.

In another aspect of the invention, a liquid crystal display device, includes a first substrate having an active region, a gate insulating film, and a plurality of thin film transistors; a second substrate having a color filter layer; a passivation film formed on the gate insulating film and having a plurality of first and second contact holes formed along a circumference of the active region, in which the first contact holes are located to the active region than the second contact holes; an active seal pattern formed on the gate insulating film within the first contact holes and on a predetermined portion of the passivation film; a dummy seal pattern formed on the gate insulating film within the second contact holes and on a predetermined portion of the passivation film; and a liquid crystal material layer formed between the first and second substrates.

In another aspect of the present invention, a method of fabricating a liquid crystal display device includes the steps of forming a gate insulating film and a plurality of thin film transistors within an active region of a first substrate, forming a passivation film on the gate insulating film and the thin film transistors, forming a plurality of first and second contact holes along a circumference of the active region by removing portions of the passivation film, forming an active seal pattern along a direction of the plurality of first contact holes and a dummy seal pattern along a direction of the plurality of second contact holes, and bonding a second substrate onto the first substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
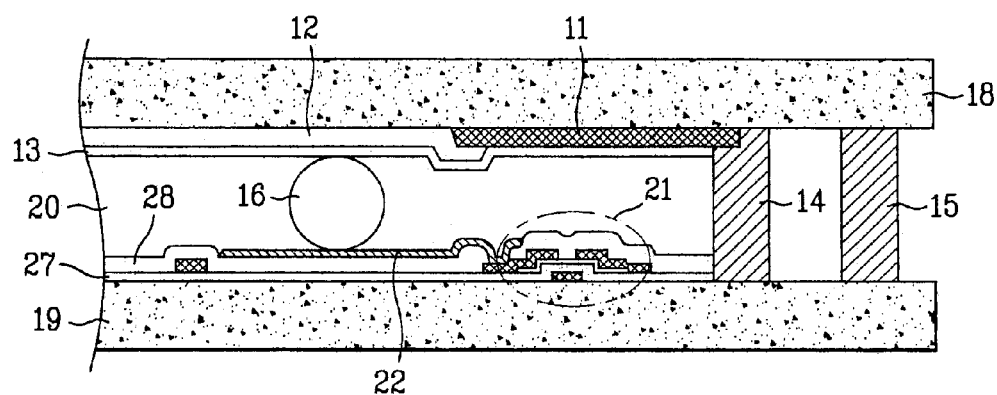
FIG. 1 is a cross sectional view of an LCD device, according to the related art.
Figure 2:
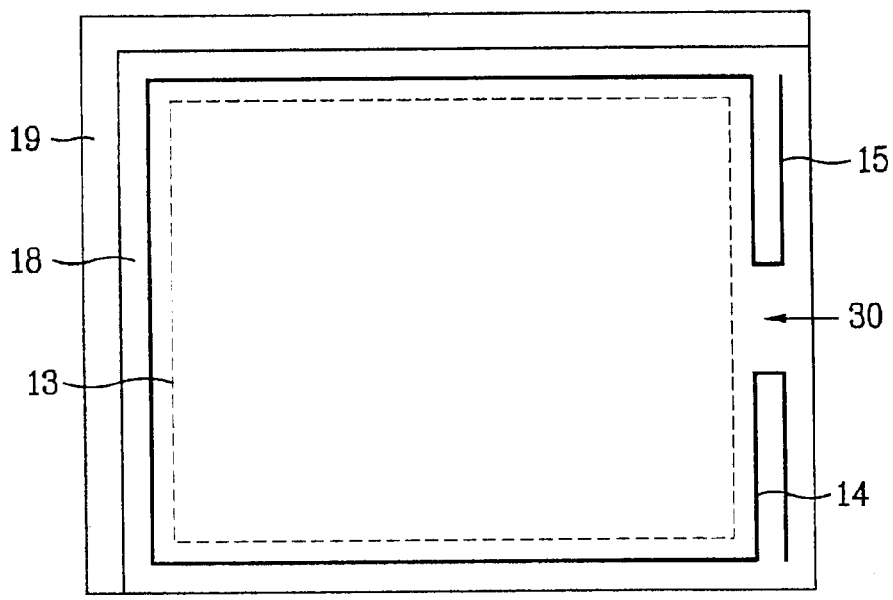
FIG. 2 is a plane view illustrating a seal pattern of an LCD device, according to the related art.
Figure 3:
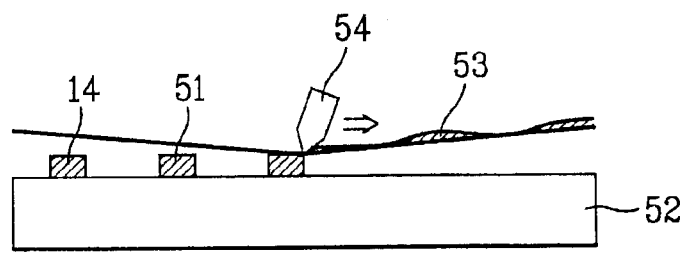
FIG. 3 is a cross sectional view illustrating a sealant printing apparatus for describing a screen printing method, according to the related art.
Figure 4A:
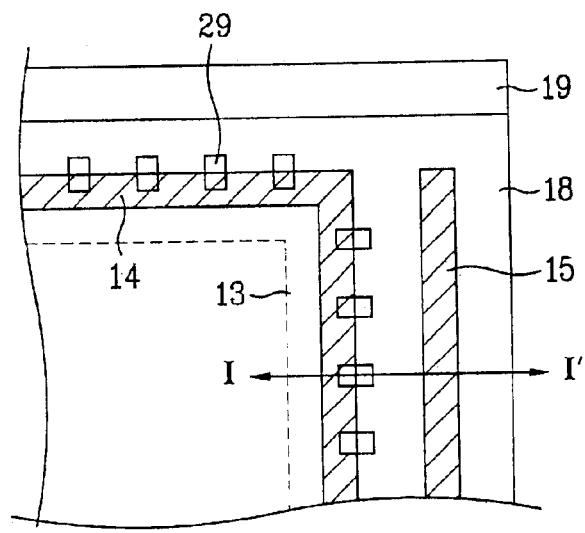
FIG. 4A is a plane view of an LCD device, according to the related art.
Figure 4B:
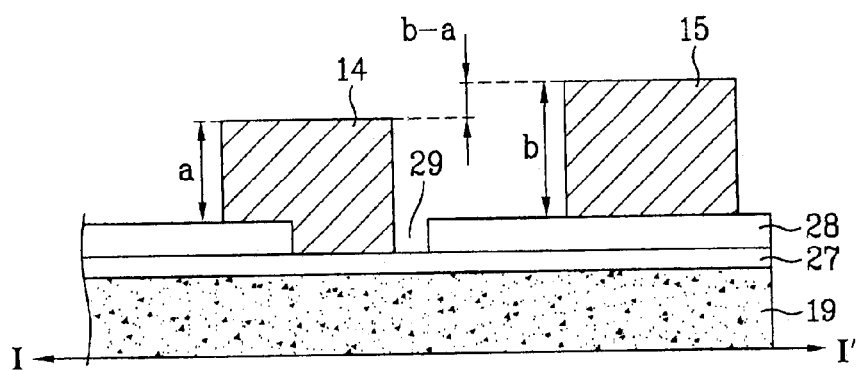
FIG. 4B is a cross sectional view taken along I–I' of FIG. 4A, according to the related art.
Figure 5:
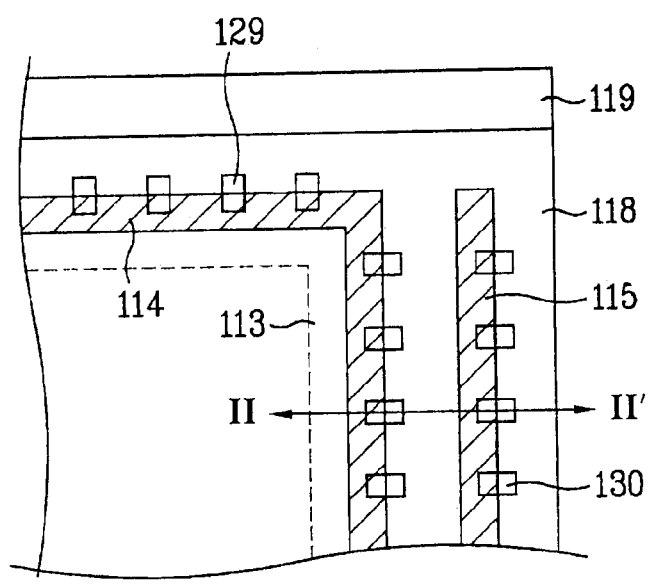
FIG. 5 is a plane view of an exemplary LCD device, according to the present invention.

FIG. 5 is a plane view of an exemplary LCD device according to the present invention and FIGS. 6A to 6E are cross sectional views taken along the line II–II' of FIG. 5, according to the present invention.

In FIG. 5 the LCD device may include upper and lower substrates 118 and 119, and a liquid crystal material layer disposed therebetween. Accordingly, the lower substrate may be divided into an active region 113 and a periphery part.

In FIGS. 6A to 6E the lower substrate 119 may include gate and data lines (not shown), a gate insulating film 127, a TFT (not shown), a passivation film 128, and a pixel electrode (not shown). The gate and data lines may be formed to cross each other, and may deliver signals. The gate insulating film 127 may be interposed between the gate and data lines(not shown) to insulate them from each other. The TFT (not shown) formed at the crossings of the gate and data lines may switch the signals transmitted along the gate and data lines. The passivation film 128 may be formed on an entire surface of the lower substrate 119 including the TFT by depositing an organic insulating material for example. The pixel electrode may be connected to the TFT on the passivation film 128, and thereby forming an electric field with a common electrode (not shown).

In addition, the gate insulating film 127 and the passivation film 128 may be deposited on the entire surface of the lower substrate 119 to be extended along the periphery of the active region 113.

In FIG. 5, a plurality of first and second contact holes 129 and 130 may be formed along the circumference of the active region 113 on the passivation film 128 for exposing the gate insulating film 127. The first contact holes 129 may be closer to the active region 113 than the second contact holes 130. The active seal pattern 114 may be formed along the circumference of the active region 113 along a direction of the first contact holes 129, thereby preventing leakage of the liquid crystal material and maintaining a uniform cell gap between the upper and lower substrates 118 and 119. Accordingly, the active seal pattern 114 may be formed on predetermined portions of both the passivation film 128 and the exposed gate insulating film 127.

The dummy seal pattern 115 may be formed on the outer part of the active seal pattern 114 to absorb vibrational shock during the scribing and breaking process. In addition the dummy seal pattern 115 may maintain a uniform cell gap along the periphery of the active region 113. Accordingly, the dummy seal pattern 115 may be formed on predetermined portions of both the passivation film 128 and the exposed gate insulating film 127, along a direction of the second contact holes 130. In addition, neither the active seal pattern 114 nor the dummy seal pattern 115 may be formed on a liquid crystal material inlet to which a liquid crystal material may be injected for example.

As described above, the LCD device may include a plurality of the second contact holes 130 and a plurality of the first contact holes 129. The first contact holes 129 may be formed on the lower part of the active seal pattern 114 to improve adhesive strength between the passivation film 128 and the active seal pattern 115. The second contact holes 130 may be formed on the lower part of the dummy seal pattern 115 to prevent generation of a step difference with the passivation film 128. The second contact holes 130 may have a same size and interval as the first contact holes 129. Alternatively, the first and second contact holes 129 and 130 may have different sizes and different intervals.

Accordingly, the active and dummy seal patterns 114 and 115 may be attached to the gate insulating film 127 of the lower part of the passivation film 128 through the first and second contact holes 129 and 130. Thus, the active and dummy seal patterns 114 and 115 may have improved adhesive strength.

In addition, because the contact holes 130 may be formed on the lower part of the active seal pattern 114 and on the lower part of the dummy seal pattern 115, the step difference between the active and dummy seal patterns 114 and 115, which occurs when the contact holes are formed only on the lower part of the active seal pattern 114, may be prevented.

A method for fabricating an LCD device having the above-described construction will be described in detail.

Figure 6A:
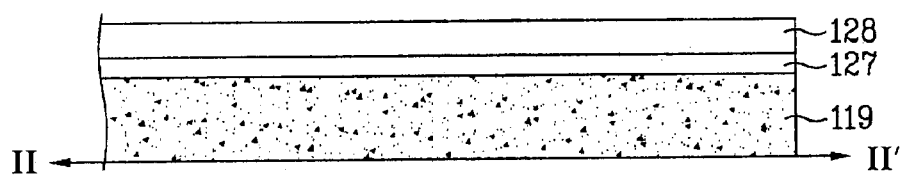
FIGS. 6A to 6E are cross sectional views along II–II' of FIG. 5 according to the present invention.

In FIG. 6A, a gate line (as shown), a gate insulating film 127, and a data line (not shown) may be sequentially formed on the lower substrate 119. In addition, on the crossings of the gate and data lines, a TFT that includes a gate electrode, a gate insulating film, a semiconductor layer, and source/drain electrodes may be formed at locations corresponding to intersections of the gate and data lines. Then, a passivation film 128 may be formed on the entire surface of the lower substrate 119, including the TFT, by deposition of an organic insulating film such as BCB and an acrylic resin.

Figure 6B:
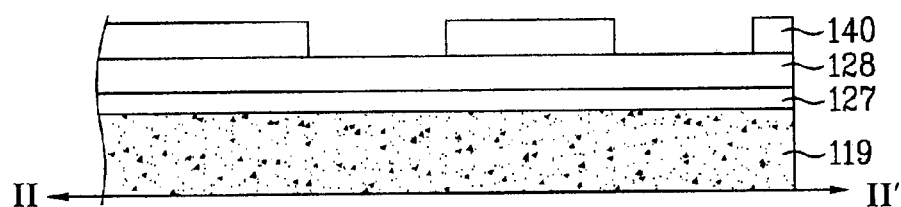
Figure 6C:
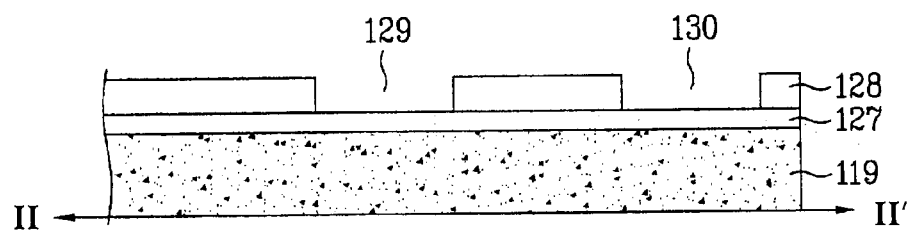

In FIGS. 6B and 6C, a plurality of first and second contact holes 129 and 130 may be formed by selectively eliminating the passivation film 128 after spreading a photoresist 140 on the passivation film 128, and patterning the photoresist 140. Accordingly, portions of gate insulating film 127 may be exposed. The first and second contact holes 129 and 130 may be formed along the circumference of the active region 113. In addition, the first contact holes 129 may be formed to be closer to the active region 113 than the second contact holes 130. Then the photoresist 140 may be eliminated, and a pixel electrode made of ITO may be formed on the passivation film 128 to be connected to the TFT.

Figure 6D:
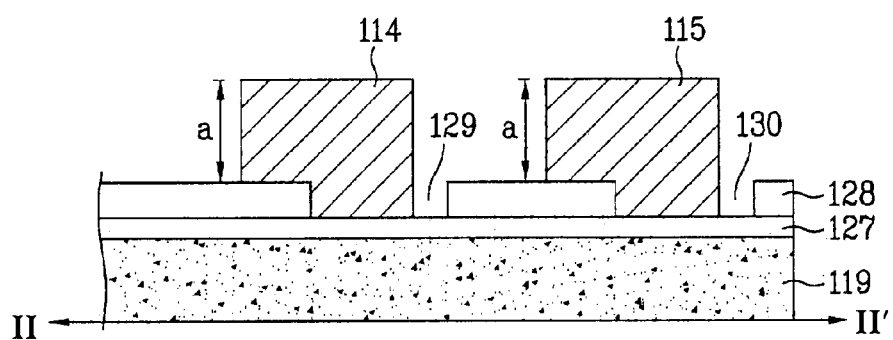

In FIG. 6D, the active and dummy seal patterns 114 and 115 may be formed on a predetermined portion of the periphery of the active region 113 by a screen printing method, or a dispensing method, for example. The active seal pattern 114 may be formed on a predetermined portion of the gate insulating film 127 that is exposed by the first contact holes 129, and on a predetermined portion of the passivation film 128. The dummy seal pattern 115 may be formed on a predetermined portion of the gate insulating film 127 that is exposed by the second contact holes 130, and on a predetermined portion of the passivation film 128.

Accordingly, since the step difference between the active and dummy seal patterns 114 and 115 is prevented, a cell gap along the periphery of the active region 113 is uniformly maintained. In addition, the adhesive strength of the upper and lower substrates 118 and 119 maybe improved by supplementing a poor adhesive strength between the dummy seal pattern 115 and the passivation film 128.

Figure 6E:
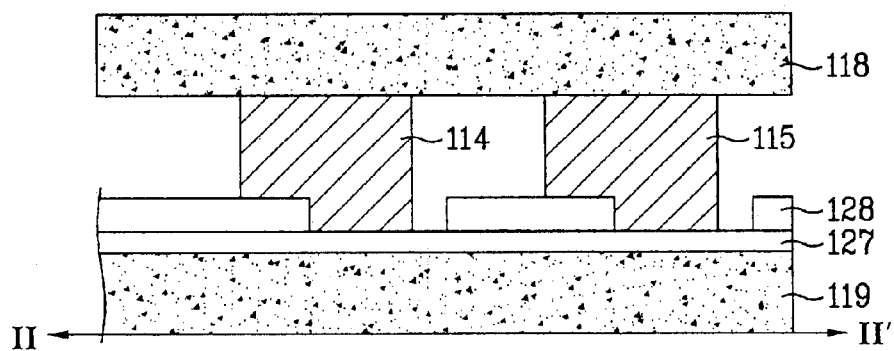

In FIG. 6E, an upper substrate 118 upon which a color filter layer may be formed may be bonded to the lower substrate 119. The upper and lower substrates 118 and 119 may be completely bonded as the active and dummy seal patterns 114 and 115 are hardened using heat and pressure. The seal patterns may be formed of high-polymers having excellent adhesive power, such as an epoxy resin, thermo-setting resin, and photo-setting resin. A spacer may be inserted between the upper and lower substrates 118 and 119 to maintain a cell gap on the active region 113. The cell gap maintained by the spacer may also be uniformly maintained along the periphery of the active region 113 by the seal patterns 114 and 115. Substantially, a liquid crystal material layer of about 1–9 μm may be formed between the upper and lower substrates 118 and 119. To cut the upper and lower substrates 118 and 119 in to a panel unit, a scribe line may be formed on a surface of one of the upper and lower substrates 118 and 119 using a scribe wheel for example. Then, a breaking process may be performed. Accordingly, the scribe line may be formed parallel with the active and dummy seal patterns 114 and 115.

The method of forming the liquid crystal material layer may be divided into a liquid crystal injection type and a liquid crystal dropping type. In the liquid crystal injection type method, the upper and lower substrates may be bonded together and an interior pressure of the liquid crystal cell may be reduced. Then, a liquid crystal material may be injected between the upper and lower substrates 118 and 119 by capillary action. In the liquid crystal dropping type method, the liquid crystal material may be evenly applied onto one of the substrates and the substrates are bonded together.

Next, after a washing process that eliminates alien substances from the panel, the panel may be checked for flaws by visual inspection and by application of an electric signal. Then, a module process may be performed to finish the LCD device. During the process, a polarized light plate may be attached onto the surface of the substrate of the liquid crystal panel, and an external driving circuit may be connected to the liquid crystal panel. In addition, a backlight may be installed as a light source.

It will be apparent to those skilled in the art that various modifications and variations can be made in the LCD device and method of fabricating the same without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a substrate having an active region and a periphery region;
   an insulating film formed on the substrate;
   a passivation film formed on the insulating film and having a plurality of first and second contact holes formed along a circumference of the active region;
   a first seal pattern formed on the passivation film along a direction of the first contact holes; and
   a second seal pattern formed on the passivation film along a direction of the second contact holes.

2. The device according to claim 1, wherein the plurality of first contact holes are closer to the active region than the plurality of second contact holes.

3. The device according to claim 1, wherein a size of the plurality of first contact holes is equal to a size of the plurality of second contact holes.

4. The device according to claim 1, wherein an interval between the plurality of first contact holes is equal to an interval between the plurality of second contact holes.

5. The device according to claim 1, wherein the passivation film includes an organic insulating material.

6. The device according to claim 1, wherein predetermined portions of the first and second seal patterns are formed on the insulating film within the first and second contact holes, respectively.

7. A liquid crystal display device, comprising:

a first substrate having an active region, a gate insulating film, and a plurality of thin film transistors;

a second substrate having a color filter layer;

a passivation film formed on the gate insulating film and having a plurality of first and second contact holes formed along a circumference of the active region, the first contact holes located closer to the active region than the second contact holes;

an active seal pattern formed on the gate insulating film within the first contact holes and on a predetermined portion of the passivation film;

a dummy seal pattern formed on the gate insulating film within the second contact holes and on a predetermined portion of the passivation film; and a liquid crystal material layer formed between the first and second substrates.

8. The device according to claim 7, wherein a size of the first contact holes is equal to a size of the second contact holes.

9. The device according to claim 7, wherein an interval between the plurality of first contact holes is equal to an interval between the plurality of second contact holes.

10. The device according to claim 7, wherein the passivation film includes an organic insulating material.

11. A method for fabricating a liquid crystal display device, comprising steps of:

forming a gate insulating film and a plurality of thin film transistors within an active region of a first substrate;

forming a passivation film on the gate insulating film and the thin film transistors;

forming a plurality of first and second contact holes along a circumference of the active region by removing portions of the passivation film;

forming an active seal pattern along a direction of the plurality of first contact holes and a dummy seal pattern along a direction of the plurality of second contact holes; and bonding a second substrate onto the first substrate.

12. The method according to claim 11, wherein the active and dummy seal patterns are formed using an equal amount of spraying material.

13. The method according to claim 11, wherein a size of the second contact holes is equal to a size of the first contact holes.

14. The method according to claim 11, wherein an interval between the plurality of first contact holes is equal to an interval between the plurality of second contact holes.

15. The method according to claim 11, wherein the active seal pattern is formed on the gate insulating film within the first contact holes and on a predetermined portion of the passivation film.

16. The method according to claim 11, wherein the dummy seal pattern is formed on the gate insulating film within the second contact holes and on a predetermined portion of the passivation film.

* * * * *